Dec. 30, 1924.
C. A. GODSHALK
1,521,239
VEHICLE LAMP
Filed March 4, 1924    2 Sheets-Sheet 1
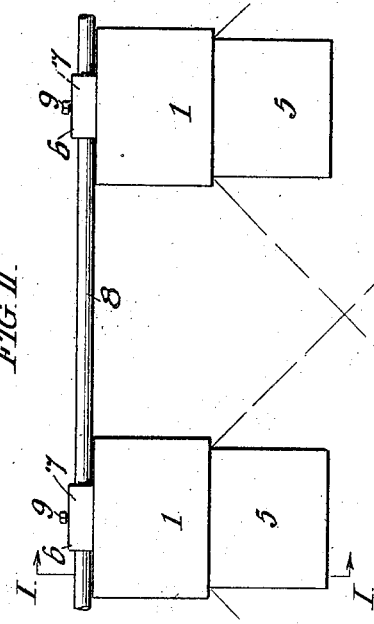
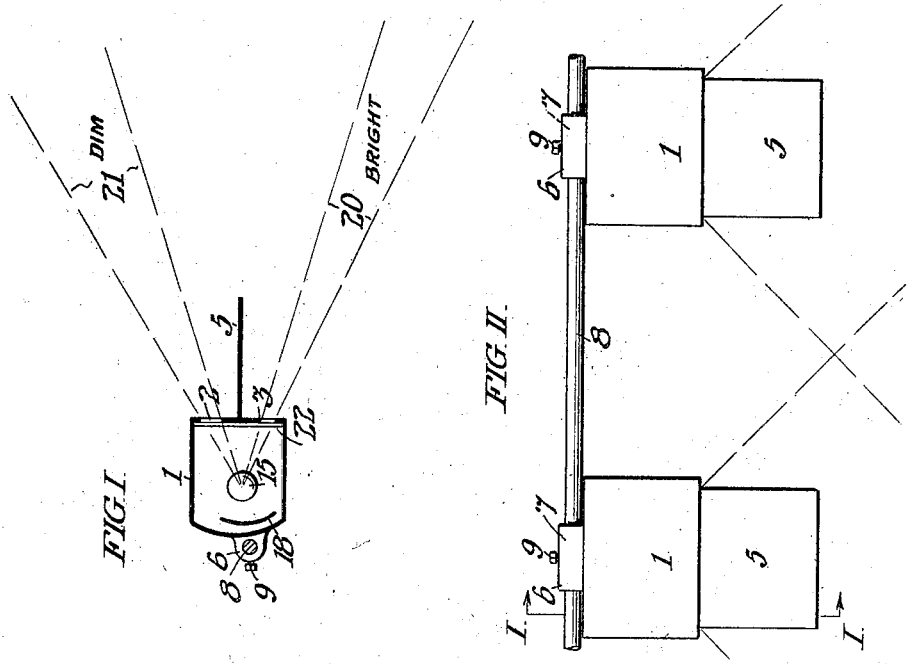
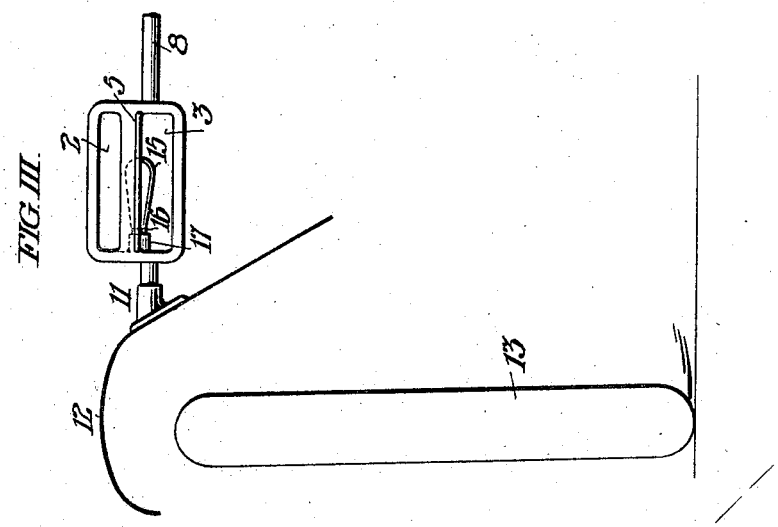
Inventor:
CLARENCE A. GODSHALK.

Dec. 30, 1924.
C. A. GODSHALK
1,521,239
VEHICLE LAMP
Filed March 4, 1924    2 Sheets-Sheet 2
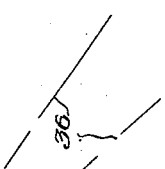
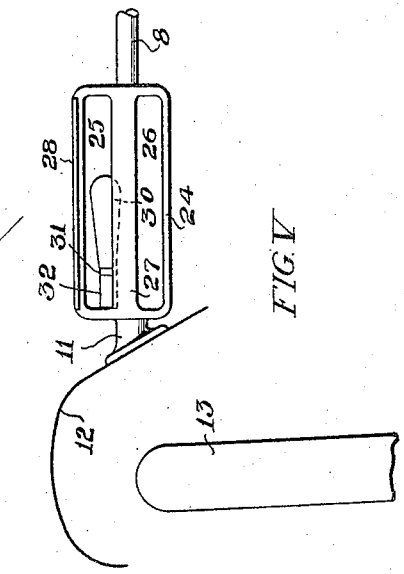
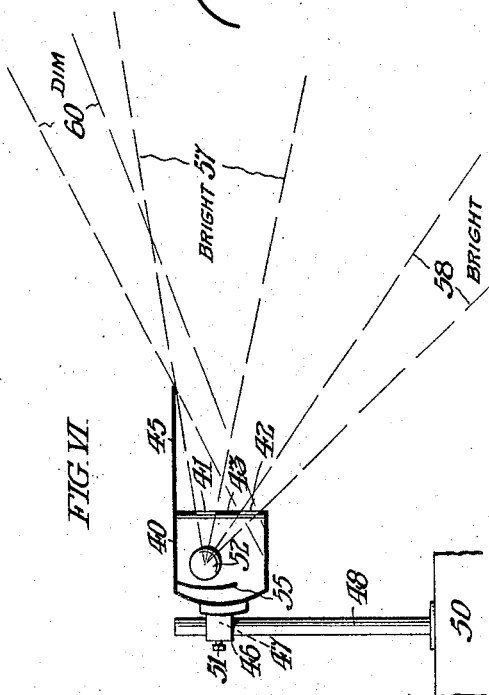
Inventor:
CLARENCE A. GODSHALK Patented Dec. 30, 1924.

1,521,239

UNITED STATES PATENT OFFICE.

CLARENCE A. GODSHALK, OF ARDMORE, PENNSYLVANIA.

VEHICLE LAMP.

Application filed March 4, 1924. Serial No. 696,881.

*To all whom it may concern:*

Be it known that I, CLARENCE A. GODSHALK, a citizen of the United States, residing at Ardmore, in the county of Montgomery and State of Pennsylvania, have invented a certain new and useful Improvement in Vehicle Lamps, whereof the following is a specification, reference being had to the accompanying drawings.

My invention is designed and adapted to provide motor vehicles with head lights in compliance with the various laws throughout the United States, which require the manifestation of lights forwardly from the vehicle, but forbid such manifestation in such direction or with such power as to afford a glare to the vision of persons approaching from the opposite direction. Ordinarily, such lights are projected from casings which are circular and provided with lenses or other dimming means which diffuse or suppress a portion of the light which is thus wasted.

It is an object and effect of my invention to avoid such waste by dividing the total volume of light from each casing in two portions, one of major brilliancy which is directed both forwardly and laterally, so as to illuminate the road but at such an angle as to prevent the glare forbidden as aforesaid; the minor portion of the light from each casing being directed both forwardly and laterally so as to supplement the illumination by the major portion of the light, but at such angle as to be visible to persons approaching in the opposite direction, without affording a glare, because of the low power of that portion of the light. As hereinafter described, I prefer to use lamp casings which are substantially rectangular and of greater extent horizontally than vertically at their fronts, and to provide each such casing with two separate and distinct openings for the respective bright and dim light rays projected therefrom; said openings being substantially rectangular and parallel with each other. Moreover, I prefer to provide a septum between said openings including a visor projecting forwardly from the casing.

My invention includes the various novel features of construction and arrangement hereinafter more definitely specified.

In said drawings; Fig. I is a vertical sectional view of a head light casing and appurtenances embodying my invention, taken on the line I, I in Fig. II.

Fig. II is a fragmentary plan view of a pair of such structures as indicated in Fig. I, provided with a yoke bar arranged to support them in proper relative position upon a vehicle.

Fig. III is a front elevation of the lamp structure shown in Fig. I, showing its yoke bar connected with the front of a vehicle which is diagrammatically indicated.

Fig. IV is a vertical sectional view of a head light casing embodying a modified form of my invention, wherein a visor is extended from the front of the casing above the upper light opening, instead of between the light openings as in Figs. I to III.

Fig. V is a fragmentary elevation similar to Fig. III, but showing the form of my invention indicated in Fig. IV.

Fig. VI is a vertical sectional view of a head light casing, similar to Fig. IV, but having supporting means permitting its angular adjustment laterally with respect to a vertical axis.

Fig. VII is a fragmentary elevation similar to Fig. V, but showing the structure indicated in Fig. VI.

Referring to the form of my invention shown in Figs. I to III inclusive; the head light casings 1 are each rectangular in front configuration and provided with two separate and distinct openings 2 and 3 which are horizontally oblong, substantially rectangular and parallel with each other, with a septum between them, including a forwardly projecting visor 5. Said visor is conveniently formed of a plane piece of metal rigidly connected with the casing 1; but may be, or include, a panel of colored glass or celluloid. Each of said casings has, in rigid connection with its rear wall, a bracket 6 with a cylindrical socket 7 extending therethrough and adapted to fit upon the yoke bar 8. Said brackets may be provided with any suitable clamping means, for instance, set screws 9; whereby said casings 1 may be adjustably secured upon said bar in any desired relation with each other. However, it may be observed that by such construction and arrangement, each of said light casings 1 is susceptible not only of lateral adjustment but also of angular adjustment with respect to the horizontal axis of said yoke bar 8. As indicated in Fig. III, said yoke bar 8 may be provided with end brackets 11 for rigid connection with opposite guards 12 for the vehicle wheels 13.

In the form of my invention shown in Figs. I to III inclusive; the source of light within the casing 1 is an incandescent electric lamp bulb 15 having its plug 16 mounted in a suitable socket 17 with its axis parallel with the axis of said yoke bar 8 and transverse to the length of the vehicle. It may be observed that said bulb 15 is disposed with such axis below the plane of the visor 5 and the reflector 18 is so formed and located as to project the major portion of the light from said source 15 forwardly through said casing opening 3 below said visor. However, the inner walls of said casings 1 also afford reflecting surfaces supplementing said reflector 18; consequently, some of the light from the source 15 is diffused aside from the main beams of respective bright rays 20 and dim rays 21 indicated by the dash lines in Fig. I. As indicated in Fig. I; said light openings 2 and 3 may be covered by a transparent or translucent panel 22, to exclude dust, rain, etc., from said casings 1. Such closures are preferably formed of glass or celluloid, and may be either plane or lenses.

The form of my invention shown in Figs. IV and V differs from that above described in that the visor is located above the upper light opening, the source of light is an electric incandescent bulb having its axis parallel with the light openings, and dim rays are projected above the bright rays by reflection from the bottom of the casing. In said figures; the head light casing 24 is rectangular in front configuration and provided with two separate and distinct openings 25 and 26 which are horizontally oblong, substantially rectangular and parallel with each other with a septum 27 between them. However, the visor 28 extends forwardly from the upper portion of said casing. Said casing 24 has, in rigid connection with its rear wall, a bracket 6 with a cylindrical socket 7 extending therethrough and adapted to fit on said yoke bar 8. Said bracket may be provided with any suitable clamping means, for instance, a set screw 9; whereby said casing 24 may be adjustably secured upon said bar 8 in any desired relation with another similar light casing; such casing 24 being susceptible not only of lateral adjustment but also of angular adjustment with respect to the horizontal axis of said yoke bar 8.

In the form of my invention shown in Figs. IV and V; the source of light within the casing 24 is an incandescent electric lamp bulb 30 having its plug 31 mounted in a suitable socket 32 with its axis parallel to the axis of said yoke bar 8 and parallel with the light openings 25 and 26 in said casing. It may be observed that the axis of said bulb 30, which thus extends transverse to the direction of traverse of the vehicle, is above said septum 27 and that the reflector 34 is so constructed and arranged as to project bright rays 35 and 36 forwardly and downwardly to illuminate the road, but that the inner walls of said casing 24 also afford reflecting surfaces supplementing said reflector 34 and projecting dim rays 37 above said bright rays 35.

As indicated in Fig. IV; said light openings 25 and 26 may be covered by a transparent or translucent panel 38, to exclude dust, rain, etc., from said casing 24. Such closures are preferably formed of glass or celluloid and may be either plane or lenses.

The form of my invention shown in Figs. VI and VII differs from those above described in that the axis of each of the head lights may be angularly adjusted laterally. In said figures; the head light casing 40 is rectangular in front configuration and provided with two separate and distinct openings 41 and 42 which are horizontally oblong, substantially rectangular and parallel with each other, with a septum 43 between them. However, the visor 45 is located above the upper opening 41. Said casing 40 has, in rigid connection with its rear wall, a bracket 46 with a cylindrical socket 47 extending therethrough and adapted to fit upon the cylindrical standard 48 which is rigidly connected with the automobile frame member 50. Said bracket 46 may be provided with any suitable clamping means, for instance, a set screw 51, whereby similar casings 40 may be adjustably secured upon respectively opposite sides of the vehicle in any desired relation with each other.

Each of said casings 40 may be raised and lowered with respect to its position on the vehicle and may be angularly adjusted laterally to project the light either parallel with the direction of the length of the vehicle or in transverse relation thereto. That is to say; a pair of such lamp casings 40 may be relatively adjusted to respectively project light in convergent or divergent directions.

In the form of my invention shown in Figs. VI and VII; the source of light within the casing 40 is an incandescent electric lamp bulb 52 having its plug 53 mounted in a suitable socket 54 with its axis extending parallel with the direction of the length of said openings 41 and 42 and transversely to the length of the vehicle. The reflector 55 is so formed and located as to project the major portion of the light from said source 52 forwardly through said casing opening 41, below said visor 45, in bright rays 57. A portion of the light from said source 52 is also projected forwardly and downwardly in bright rays 58. However, the inner walls of said casings 40 also afford reflecting surfaces supplementing said reflector 55 so that the field illuminated by light projected from said casings 40 includes dim rays 60 reflected from the bottom of the casings and projected above said bright rays 57.

Although I prefer to embody my invention in lamp casings which are rectangular and which, consequently, can be manufactured without the employment of the costly dies which are required for the ordinary circular casings; it is obvious that a casing which is circular at the front may be provided with such parallel oblong light openings as above described. Moreover, although I prefer to project the light through such oblong openings, such openings are not essential to all of the combinations of elements of my invention, which I desire to claim. Therefore, I do not desire to limit myself to the precise details of construction and arrangement herein set forth, as it is obvious that various modifications may be made therein without departing from the essential features of my invention, as defined in the appended claims. For instance, although I have shown incandescent lamp bulbs with their axes extending transversely to the length of the automobile in which they are mounted; such bulbs may be located with their axes parallel with the length of the vehicle, or otherwise.

I claim:

1. In a vehicle head light; the combination with a light casing having a substantially rectangular front of greater extent horizontally than vertically, and with two correspondingly shaped, laterally oblong, light openings therethrough, in substantially parallel relation, one above the other; of a septum between said openings including a visor extending forwardly from said casing; a source of light, within said casing, including an electric incandescent lamp bulb, having its axis parallel with said openings; and means, including a reflector behind said source, arranged to project light from said source through said casing openings and with a field of illumination including dim rays above brighter rays, said brighter rays through said lower opening and said dim rays through said upper opening; whereby a warning signal is afforded without glare, above said septum, and the road is illuminated below said septum.

2. In a vehicle head light; the combination with a light casing having a substantially rectangular front of greater extent horizontally than vertically, and with two correspondingly shaped, laterally oblong, light openings therethrough, in substantially parallel relation, one above the other; of a septum between said openings including a visor extending forwardly from said casing; a source of light, within said casing, including an electric incandescent lamp bulb, having its axis horizontal; and means, including a reflector behind said source, arranged to project light from said source through said casing openings and with a field illumination including dim rays above brighter rays; whereby a warning signal is afforded without glare, above said septum, and the road is illuminated below said septum.

3. In a vehicle head light; the combination with a light casing having a substantially rectangular front of greater extent horizontally than vertically, and with two laterally oblong, light openings therethrough, in parallel relation, one above the other; of a septum between said openings including a visor extending forwardly from said casing; a source of light, within said casing; and means, including a reflector behind said source, arranged to project light from said source through said casing openings and with a field of illumination including dim rays above brighter rays; whereby a warning signal is afforded without glare, above said septum, and the road is illuminated below said septum.

4. In a vehicle head light; the combination with a light casing having a substantially rectangular front of greater extent horizontally than vertically, and with two laterally oblong, light openings therethrough, in parallel relation, one above the other; of a septum between said openings; a source of light, within said casing; and means, including a reflector behind said source, arranged to project light from said source through said casing openings and with a field of illumination including dim rays above brighter rays; whereby a warning signal is afforded without glare, above said septum, and the road is illuminated below said septum.

5. In a vehicle head light; the combination with a light casing having a substantially rectangular front of greater extent horizontally than vertically, and with two laterally oblong, light openings therethrough, in parallel relation, one above the other; of a septum between said openings; a source of light, within said casing; and means, including a reflector, arranged to project light from said source through said casing openings and with a field of illumination including dim rays above brighter rays; whereby a warning signal is afforded without glare, above said septum, and the road is illuminated below said septum.

6. In a vehicle head light; the combination with a light casing having a front of greater extent horizontally than vertically, and with two, laterally oblong, light openings therethrough, one above the other; of a septum between said openings; a source of light, within said casing; and means, including a reflector, arranged to project light from said source through said casing openings and with a field illumination including dim rays above brighter rays; whereby a warning signal is afforded without glare, above said septum, and the road is illuminated below said septum.

7. In a vehicle head light; the combination with a light casing having two light openings therethrough, one above the other; of a septum between said openings; a source of light, within said casing; and means, including a reflector, arranged to project light from said source through said casing openings and with a field of illumination including dim rays above brighter rays; whereby a warning signal is afforded without glare, above said septum, and the road is illuminated below said septum.

8. In a vehicle head light; the combination with a light casing; of a source of light, within said casing; and means, including a reflector arranged to project light from said source through said casing with a field of illumination including dim rays above brighter rays; whereby an upper warning signal is afforded without glare, by said dim rays, and the road is illuminated, by said brighter rays, below such signal.

9. In a vehicle head light; the combination with a light casing having a substantially rectangular front of greater extent horizontally than vertically, and with two, laterally oblong, light openings therethrough, in substantially parallel relation, one above the other; of a source of light, within said casing; means, including a reflector behind said source, arranged to project light from said source through both said casing openings, in bright rays emitted from the upper opening and dim rays emitted from the lower opening; a visor above both said openings arranged to prevent the upward projection of said bright rays from said upper opening but so far above said lower opening as not to interfere with the projection of said dim rays from said lower opening; whereby a warning signal is afforded without glare, above said visor, and the road is illuminated below said visor.

10. In a vehicle head light; the combination with a light casing having a substantially retangular front of greater extent horizontally than vertically, and with two, laterally oblong, light openings therethrough, in substantially parallel relation, one above the other; of a source of light, within said casing; means, including a reflector, arranged to project light from said source through both said casing openings, in bright rays emitted from the upper opening and dim rays emitted from the lower opening; a visor above both said openings arranged to limit the upward projection of said bright rays from said upper opening but permit the upward projection of said dim rays from said lower opening; whereby a warning signal is afforded without glare, above said visor, and the road is illuminated below said visor.

11. In a vehicle head light; the combination with a light casing having a substantially rectangular front of greater extent horizontally than vertically, and with two, laterally oblong, light openings therethrough, in substantially parallel relation, one above the other; of a source of light, within said casing; means arranged to project light from said source through both said casing openings, in bright rays emitted from the upper opening and dim rays emitted from the lower opening; a visor above both said openings arranged to limit the upward projection of said bright rays from said upper opening but permit the upward projection of said dim rays from said lower opening; whereby a warning signal is afforded without glare, above said visor, and the road is illuminated below said visor.

12. In a vehicle head light; the combination with a light casing having two light openings therethrough, one above the other; of a source of light, within said casing; means arranged to project light from said source through both said casing openings, in bright rays emitted from the upper opening and dim rays emitted from the lower opening; a visor above both said openings arranged to limit the upward projection of said bright rays from said upper opening but permit the projection of said dim rays from said lower opening; whereby a warning signal is afforded without glare, above said visor, and the road is illuminated below said visor.

13. In a vehicle head light; the combination with light casing having two light openings therethrough, one above the other; of a source of light, within said casing; means, including reflecting means behind and below said source, arranged to project light from said source through both said casing openings, in bright rays emitted from the upper opening and dim rays emitted from the lower opening; a visor above both said openings arranged to prevent the upward projection of said bright rays from said upper opening but permit the projection of said dim rays from said lower opening; whereby a warning signal is afforded without glare, above said visor, and the road is illuminated below said visor.

14. In a vehicle head light; the combination with a light casing having two light openings therethrough, one above the other; of a source of light, within said casing; means, including reflecting means below said source, arranged to project light from said source through both said casing openings, in bright rays emitted from the upper opening and dim rays emitted from the lower opening; a visor above both said openings arranged to prevent the upward projection of said bright rays from said upper opening but permit the projection of said dim rays from said lower opening; whereby a warning signal is afforded without glare, above said visor, and the road is illuminated below said visor.

In testimony whereof, I have hereunto signed my name at Philadelphia, Pennsylvania, this 20th day of February, 1924.

CLARENCE A. GODSHALK.

Witnesses:
J. H. CONNELLY,
F. H. WANNER.